(12) United States Patent
Onodera et al.

(10) Patent No.: US 9,761,851 B2
(45) Date of Patent: Sep. 12, 2017

(54) VEHICLE INSTALLED BATTERY PACK WITH PRESSURE RELEASE STRUCTURE

(71) Applicant: Nissan Motor Co., Ltd., Yokohama-shi, Kanagawa (JP)

(72) Inventors: Takeshi Onodera, Machida (JP); Nobuyoshi Suzuki, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/414,123

(22) PCT Filed: Aug. 20, 2013

(86) PCT No.: PCT/JP2013/072216
§ 371 (c)(1),
(2) Date: Jan. 12, 2015

(87) PCT Pub. No.: WO2014/041970
PCT Pub. Date: Mar. 20, 2014

(65) Prior Publication Data
US 2015/0207119 A1 Jul. 23, 2015

(30) Foreign Application Priority Data
Sep. 14, 2012 (JP) .................... 2012-202472

(51) Int. Cl.
*H01M 2/10* (2006.01)
*H01M 2/12* (2006.01)
(52) U.S. Cl.
CPC ....... *H01M 2/1241* (2013.01); *H01M 2/1077* (2013.01); *H01M 2/1083* (2013.01); *H01M 2220/20* (2013.01)

(58) Field of Classification Search
CPC ............ H01M 2/1241; H01M 2/1077; H01M 2/1083; H01M 2220/20
See application file for complete search history.

(56) References Cited

U.S. PATENT DOCUMENTS

| 8,877,364 B2 | 11/2014 | Hashimura et al. |
| 2005/0069759 A1 * | 3/2005 | Shimamura ......... H01M 2/0242 429/53 |

(Continued)

FOREIGN PATENT DOCUMENTS

| CN | 101189746 A | 5/2008 |
| CN | 102317097 A | 1/2012 |

(Continued)

*Primary Examiner* — Emily Le
*Assistant Examiner* — Lilia V Nedialkova
(74) *Attorney, Agent, or Firm* — Global IP Counselors, LLP (57) ABSTRACT

A vehicle installed battery pack is provided with a pressure release structure. The vehicle installed battery pack includes a battery pack case, a battery pack module. The battery pack case includes a battery pack lower frame and a battery pack upper cover. The battery pack module is disposed in the battery pack lower frame. The battery pack upper cover is securely joined to the battery pack lower frame via a seal member that extends continuously about an entire perimeter of respective outside peripheral edge portion of the battery pack upper cover. The battery pack upper cover includes a deforming stepped portion having a height difference at least in a heightwise direction; and a weakly joined portion having a lower joint strength than other joined portions being set in an area of the seal member extending continuously about the entire perimeter. The area corresponds to the deforming stepped portion.

13 Claims, 9 Drawing Sheets

(56) References Cited

U.S. PATENT DOCUMENTS

| | | | | |
|---|---|---|---|---|
| 2007/0037044 A1* | 2/2007 | Sato | ............... | H01M 2/0267 |
| | | | | 429/96 |
| 2009/0081542 A1* | 3/2009 | Yageta | ............... | H01G 9/08 |
| | | | | 429/185 |
| 2010/0273034 A1* | 10/2010 | Hermann | ............ | H01M 2/08 |
| | | | | 429/62 |
| 2011/0300427 A1* | 12/2011 | Iwasa | ............... | B60K 1/04 |
| | | | | 429/99 |
| 2012/0107654 A1* | 5/2012 | Bhardwaj | ......... | H01M 2/0212 |
| | | | | 429/94 |

FOREIGN PATENT DOCUMENTS

| | | |
|---|---|---|
| CN | 102473873 A | 5/2012 |
| JP | 2006-236775 A | 9/2006 |
| JP | 2007-87922 A | 4/2007 |
| JP | 2010-232330 A | 10/2010 |
| JP | 2011-23230 A | 2/2011 |
| WO | 2011/154790 A1 | 12/2011 |

* cited by examiner

VEHICLE INSTALLED BATTERY PACK WITH PRESSURE RELEASE STRUCTURE

CROSS-REFERENCE TO RELATED APPLICATIONS

This application is a U.S. National stage application of International Application No. PCT/JP2013/072216, filed Aug. 20, 2013, which claims priority to Japanese Patent Application No. 2012-202472 filed in Japan on Sep. 14, 2012. The entire disclosure of Japanese Patent Application No. 2012-202472 is hereby incorporated herein by reference.

BACKGROUND

Field of the Invention

The present invention relates to a pressure release structure for a vehicle installed battery pack which is installed in an electric vehicle as a source of propulsive power for the vehicle.

Background Information

Vehicle installed battery packs in which the opening of a case member is covered with a cover member, a sealing member is interposed between the case member and the cover member, and a case chamber is hermetically sealed are known in the prior art (e.g., refer to Japanese Laid-Open Patent Application No. 2010-232330).

SUMMARY

However, while the case chamber can be hermetically sealed in these conventional vehicle installed battery packs, a problem is presented in that the units lack a function whereby, when the internal pressure of the case chamber has risen due to production of gases, the internal gases are discharged to the outside.

Specifically, in the case of a vehicle installed battery pack, when an adverse event such as overcharging occurs, gases are produced from the battery module which is situated in the interior of the case chamber and which includes multiple battery cells, leading in some cases to increased internal pressure of the case chamber. As indicated, e.g., in Japanese Laid-Open Patent Application No. 2006-236775, gas production from a battery module occurs when gases are produced in the interior of the battery cells, and as the internal pressure rises, a relatively thin section of the seal member on the cell interior side ruptures, allowing the gases to be discharged to the outside (into the case chamber).

In view of the aforedescribed problem, it is an objective of the present invention to provide a pressure release structure for a vehicle installed battery pack, whereby when the internal pressure of the case chamber has risen due to production of gases, the internal gases are discharged to the outside through a separable opening of a weakly joined portion.

Means Used to Solve the Above-Mentioned Problems

In order to achieve the above objective, according to the present invention, a battery pack case includes a battery pack lower frame and a battery pack upper cover, and a battery module is arranged in the battery pack lower frame.

In this vehicle installed battery pack, the battery pack upper cover is securely joined to the battery pack lower frame via a seal member which extends continuously about the entire perimeter along the respective outside peripheral edge portions.

The battery pack upper cover is provided with a deforming stepped portion having a height difference at least in the heightwise direction.

In an area corresponding to the deforming stepped portion within the seal member extending continuously about the entire perimeter, there is established a weakly joined portion of lower joint strength than in the rest of the joined portion.

As described above, the battery pack upper cover is provided with a deforming stepped portion having a height difference at least in the heightwise direction. Then, in an area of the seal member which extends continuously about the entire perimeter, the area corresponding to the deforming stepped portion, there is established a weakly joined portion of lower joint strength than in the rest of the joined portion. Consequently, when gases are produced from the battery module arranged in the interior of the case chamber, and the internal pressure of the case chamber rises, the internal pressure concentrates in a section protruding furthest to the case center side within the case structure, specifically, the deforming stepped portion of the battery pack upper cover. Due to this internal pressure concentration, in the deforming stepped portion, the battery pack upper cover undergoes deformation in a direction that eliminates the height difference of the step in the heightwise direction, i.e., in the heightwise direction from the lower step to towards the higher step. Due to this deformation of the cover, the joint of the weakly joined portion which has been established in the area corresponding to the deforming stepped portion splits, the outside peripheral edge portion of the battery pack upper cover separates from the outside peripheral edge portion of the battery pack lower frame, and an opening forms in the weakly joined portion. For this reason, when internal pressure of the case chamber has risen due to production of gases, the internal gases are discharged to the outside from the opening of the weakly joined portion, without inducing rupture or breakage of the battery pack upper cover. Thus, internal pressure concentrated at the deforming stepped portion of the battery pack upper cover prompts deformation of the battery pack upper cover, and in association with deformation of the cover, the weakly joined portion splits, forming an opening through which the case chamber communicates with the outside air. For this reason, when internal pressure of the case chamber has risen due to production of gases, the internal gases can be discharged to the outside through the separable opening of the weakly joined portion.

BRIEF DESCRIPTION OF THE DRAWINGS

Referring now to the attached drawings which form a part of this original disclosure.

DETAILED DESCRIPTION OF THE EMBODIMENTS

The preferred embodiment of the pressure release structure for a vehicle installed battery pack of the present invention is described below on the basis of a first embodiment shown in the drawings.

First Embodiment

First, the configuration will be described. The description of the configuration in the pressure release structure for a vehicle installed battery pack of the first embodiment will be divided into the "Schematic configuration of electric car with battery pack installed," "Configuration of battery pack," and "Detailed configuration of pressure release structure provided to battery pack."

Schematic Configuration of Electric Car with Battery Pack Installed

Figure 1:
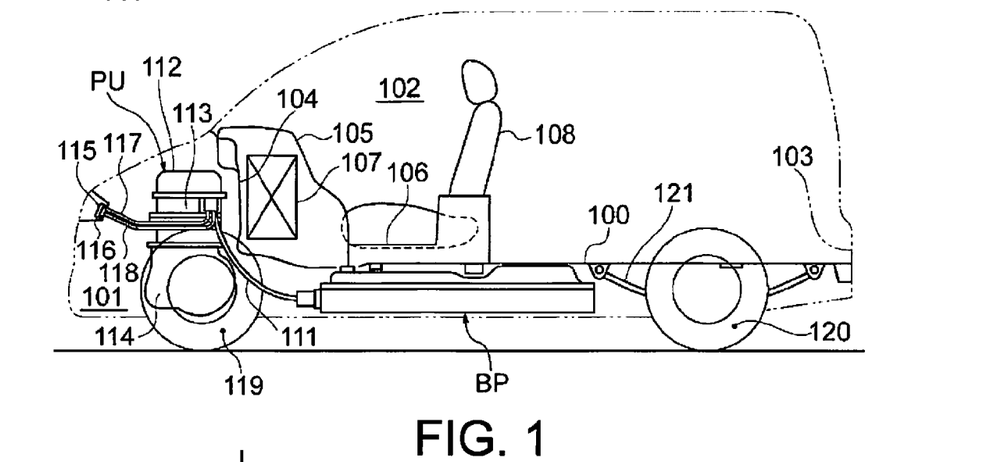
FIG. 1 is a schematic side view showing an electric car of minivan type with the vehicle installed battery pack of a first embodiment installed.
Figure 2:
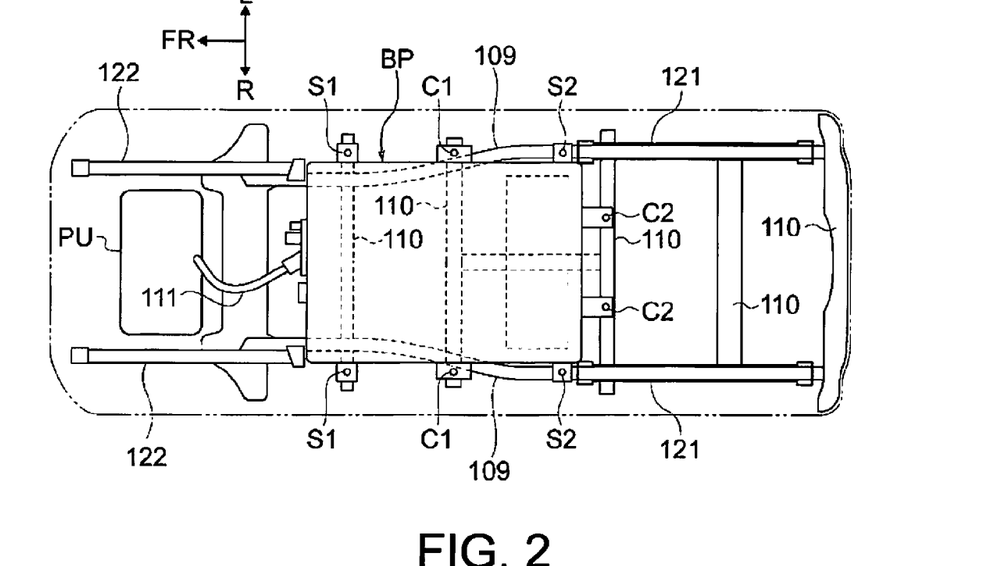
FIG. 2 is a schematic [FIG. 2] Schematic bottom view showing an electric car of minivan type with the vehicle installed battery pack of the first embodiment installed.

FIGS. 1 and 2 are a schematic side view and a schematic bottom view, showing an electric car of minivan type with the vehicle installed battery pack of the first embodiment installed. The schematic configuration of an electric car with a battery pack installed will be described below on the basis of FIGS. 1 and 2.

As shown in FIGS. 1 and 2, the electric car is defined by a floor panel 100 and a dashboard panel 104 into a motor compartment 101 and a passenger compartment 102. A battery pack BP is arranged below the floor panel 100, and a power unit PU is arranged in the motor compartment 101.

This power unit PU drives the left and right front wheels 119. Specifically, the left and right front wheels 119 are the drive wheels, and left and right rear wheels 120 are the driven wheels.

As shown in FIG. 1, the passenger compartment 102 is formed above the floor panel 100, ensuring space for passengers and cargo from the position of the dashboard panel 104 to the position of a vehicle rear end surface 103. The floor panel 100 is of flat shape minimizing irregularities of the floor surface from the vehicle front to the vehicle rear. The passenger compartment 102 has an instrument panel 105, a center console box 106, an A/C unit 107, and passenger seats 108.

As shown in FIG. 1, the battery pack BP is arranged at a position in a central portion of the wheel base, below the floor panel 100, and, as shown in FIG. 2, is supported at ten points with respect to vehicle body members serving as vehicle body reinforcing members. The vehicle body members have a pair of left and right motor compartment side members 122, 122, a pair of left and right vehicle body side members 109, 109, and a plurality of vehicle body cross members 110, 110 . . . . The battery pack BP is supported at either side at six support points, i.e., a pair of left and right first vehicle body side member support points S1, S1, a pair of left and right first vehicle body cross member support points C1, C1, and a pair of left and right second vehicle body side member support points S2, S2. The rear side of the battery pack BP is supported at two points by a pair of left and right second vehicle body cross member support points C2, C2. The front side of the battery pack BP is supported at two points by member support points, not illustrated.

As shown in FIG. 1, the power unit PU is arranged in the motor compartment 101, and is connected to the battery pack BP via a heavy current harness 111 used for charge and discharge. In this power unit PU, constituent elements are arranged stacked in a longitudinal direction, the unit having a heavy current module 112 (DC/DC converter/charger), an inverter 113, and a motor drive unit 114 (motor for propulsion/reduction gear/differential gear). A rapid charging port 115 and a normal charging port 116 having charging port leads are situated at a central location on the front surface of the vehicle. The rapid charging port 115 and the heavy current module 112 are connected by a rapid charging harness 117. The normal charging port 116 and the heavy current module 112 are connected by a normal charging harness 118.

The left and right front wheels 119 are supported by an independent suspension type suspension, and the left and right rear wheels 120 are supported by an axle suspension type leaf-spring suspension 121, 121.

Configuration of Battery Pack

Figure 3:
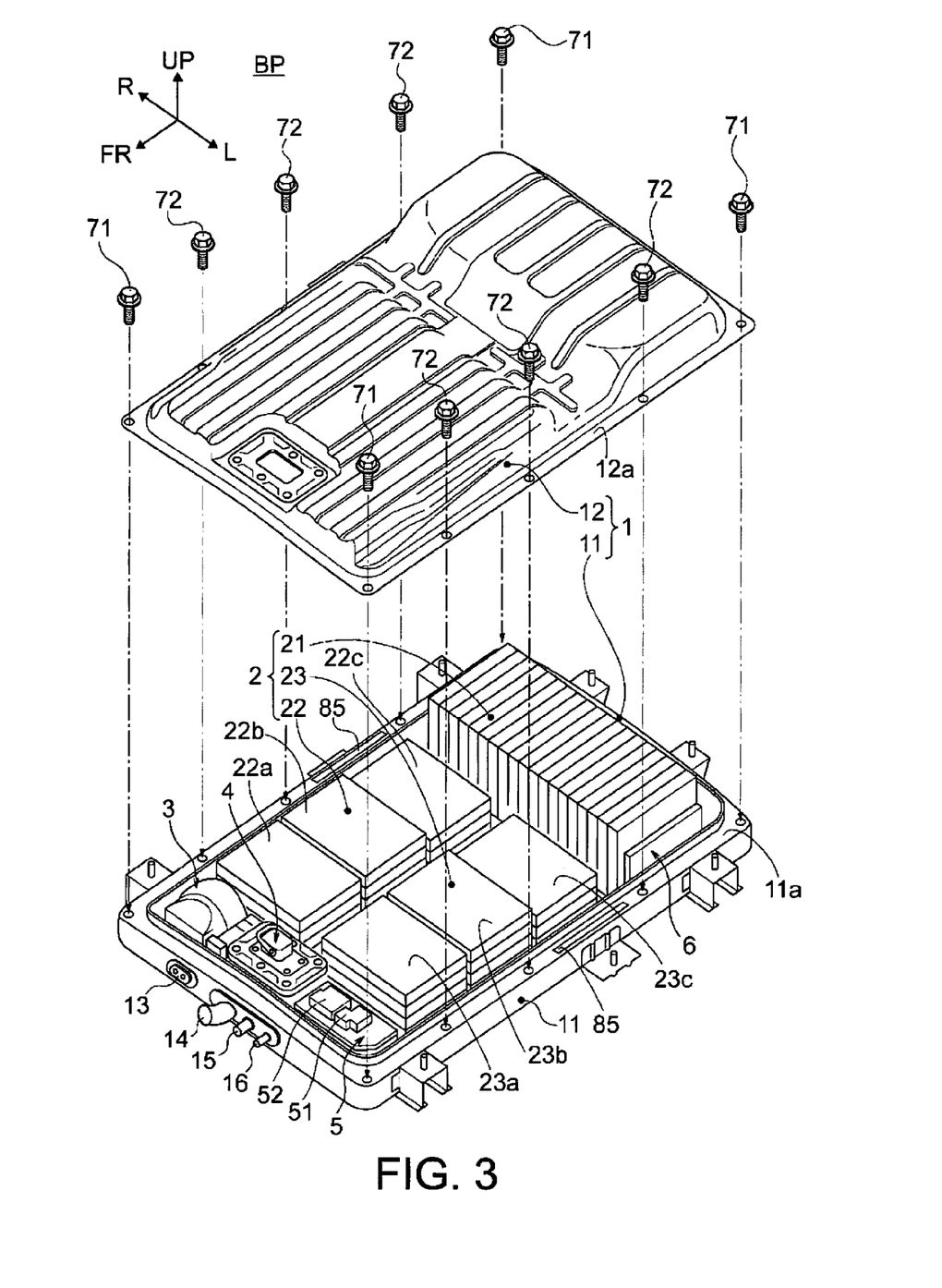
FIG. 3 is an overall exploded perspective view showing a battery pack BP provided with the pressure release structure of the first embodiment.

FIG. 3 is an overall exploded perspective view showing the battery pack BP provided with the pressure release structure of the first embodiment. The configuration of the battery pack will be described below on the basis of FIG. 3.

As shown in FIG. 3, the battery pack BP of the first embodiment is provided with a battery pack case 1, a battery module 2, a temperature regulating air unit 3, a service disconnect switch 4 (hereinafter called an "SD switch"), a junction box 5, and a lithium ion battery controller 6 (hereinafter called an "LB controller").

As shown in FIG. 3, the battery pack case 1 includes two parts: a battery pack lower frame 11 and a battery pack upper cover 12.

As shown in FIG. 3, the battery pack lower frame 11 is a frame member securely fastened to a vehicle body member. This battery pack lower frame 11 has an installation space (case chamber) defined by square recesses in which the battery module 2 and pack constituent elements 3, 4, 5, 6 are installed. To a frame front end portion of the battery pack lower frame 11 are attached a refrigerant line connector terminal 13, a battery-side heavy current connector terminal 14, a PTC heater connector terminal 15, and a light current connector terminal 16.

As shown in FIG. 3, the battery pack upper cover 12 is a cover member which is securely fastened in ten positions in an outside peripheral edge portion 11a of the battery pack lower frame 11. Bolt holes are formed in ten locations in the outside peripheral edge portion 11a of the battery pack lower frame 11, and in an outside peripheral edge portion 12a of the battery pack upper cover 12, respectively. Stud nuts, not illustrated, are securely welded at inside positions in the bolt holes, in the bolt holes formed at the ten locations in the battery pack lower frame 11. Meanwhile, of the bolt holes formed at the ten locations in the battery pack upper cover 12, four grounding bolts 71 are inserted into bolt holes at four corner positions, and a total of six shoulder bolts 72 are inserted into bolt holes respectively arrayed in the vehicle lengthwise direction on both the left and right sides. The battery pack upper cover 12 has a cover surface defined by a recessed/protruding step surface profile corresponding to the pressure release structure (discussed below) and to the recessed/protruding vertical profiles of particularly the battery module 2 among the pack constituent elements 2, 3, 4, 5, 6 installed in the battery pack lower frame 11.

As shown in FIG. 3, the battery module 2 is installed in the battery pack lower frame 11, and includes three segmented modules: a first battery module 21, a second battery module 22, and a third battery module 23. Each of the battery modules 21, 22, 23 is an aggregate structure including a plurality of stacked battery cells composed of secondary cells (lithium ion batteries or the like). The specific constitutions of the battery modules 21, 22, 23 are described below.

As shown in FIG. 3, the first battery module 21 is installed within the battery pack lower frame 11, in an area to the rear part of the vehicle. This first battery module 21 has, as constituent units thereof, battery cells of thin cuboid shape, and is prepared by stacking a plurality of the battery cells in the thickness direction. The constitution is a longitudinally stacked one (e.g., of 20 longitudinally stacked cells) in which the battery cells are installed with the stacking direction aligned with the vehicle width direction.

As shown in FIG. 3, the second battery module 22 and the third battery module 23 are respectively installed as a pair of modules divided between the left and right in the vehicle width direction in a central area of the vehicle toward the front from the first battery module 21, within the battery pack lower frame 11. This second battery module 22 and the third battery module 23 are constituted as flat stacks which are completely identical in pattern. Specifically, the modules have as their constituent units battery cells of thin cuboid shape, and are prepared as a plurality (e.g., 1 set of four and two sets of five) of stacks each containing a plurality (e.g., 4 or 5) of battery cells stacked in the thickness direction. The flat-stacked cells, with the stacking direction of the battery cells aligned with the vehicle vertical direction, are arrayed in multiple rows in the vehicle lengthwise direction, for example, in stacks of four, stacks of five, and stacks of five in order from the vehicle rear towards the vehicle front. As shown in FIG. 3, the second battery module 22 has front-side battery module parts 22a, 22b, and a rear-side battery module part 22c the height dimension of which is one cell shorter than the front-side battery module parts 22a, 22b. As shown in FIG. 3, the third battery module 23 has front-side battery module parts 23a, 23b, and a rear-side battery module part 23c the height dimension of which is one cell shorter than the front-side battery module parts 23a, 23b.

As shown in FIG. 3, the temperature regulating air unit 3 is arranged within the battery pack lower frame 11, in an area at the right side of the space at the vehicle front side, and blows temperature regulating air (cold air or hot air) into a blower duct of the battery pack BP. A refrigerant is introduced into an evaporator of the temperature regulating air unit 3 via the refrigerant line connector terminal 13 attached to the front end part of the frame. A heater-energizing electrical current is introduced into a PTC heater of the temperature regulating air unit 3 via the junction box 5.

As shown in FIG. 3, the SD switch 4 is arranged within the battery pack lower frame 11, in a central area of the space at the vehicle front side. The switch, through a manual operation, mechanically disconnects a battery heavy current circuit. The battery heavy current circuit is formed by interconnecting, via a bus bar, the battery modules 21, 22, 23 equipped with an internal bus bar, the junction box 5, and the SD switch 4. When performing inspection, repair, part replacement, or the like on the heavy current module 112, the inverter 113, and the like, the SD switch 4 is switched by a manual operation to the switch ON or switch OFF position.

As shown in FIG. 3, the junction box 5 is arranged within the battery pack lower frame 11, in an area at the left side of the space at the vehicle front side, and intensively carries out feed/disconnection/distribution of heavy current by a relay circuit. The junction box 5 is equipped both with a temperature regulating relay 51 and a temperature regulating controller 52 for carrying out control of the temperature regulating air unit 3. The junction box 5 and the heavy current module 112 of the power unit PU are connected via the battery-side heavy current connector terminal 14 and the heavy current harness 111. The junction box 5 and an external electronic control system are connected via the light current connector terminal 16 and a light current harness.

As shown in FIG. 3, the LB controller 6 is arranged at a position at the left side end face of the first battery module 21, and carries out capacity management, temperature management, and voltage management of the battery modules 21, 22, 23. This LB controller 6, through a computational process based on a temperature detection signal from a temperature detection signal line, a battery voltage detection value from a battery voltage detection line, and a battery current detection signal from a battery current detection signal line, acquires battery capacity information, battery temperature information, and battery voltage information. The LB controller 6 and the external electronic control system are connected via a light current harness which transmits on/off information about the relay circuit, as well as the battery capacity information, the battery temperature information, and the like.

Detailed Configuration of Pressure Release Structure Provided to Battery Pack

FIGS. 4 to 10 show the detailed configuration of the pressure release structure provided to the battery pack of the first embodiment. The detailed configuration of the pressure release structure provided to the battery pack is described below on the basis of FIGS. 4 to 10.

The pressure release structure provided to the battery pack BP of the first embodiment is provided with a strong adhesive seal member 81 (seal member), a weak adhesive seal member 82 (seal member), deforming stepped portions 83, a pair of weakly joined portions 84, and a pair of recessed areas 85.

Figure 4:
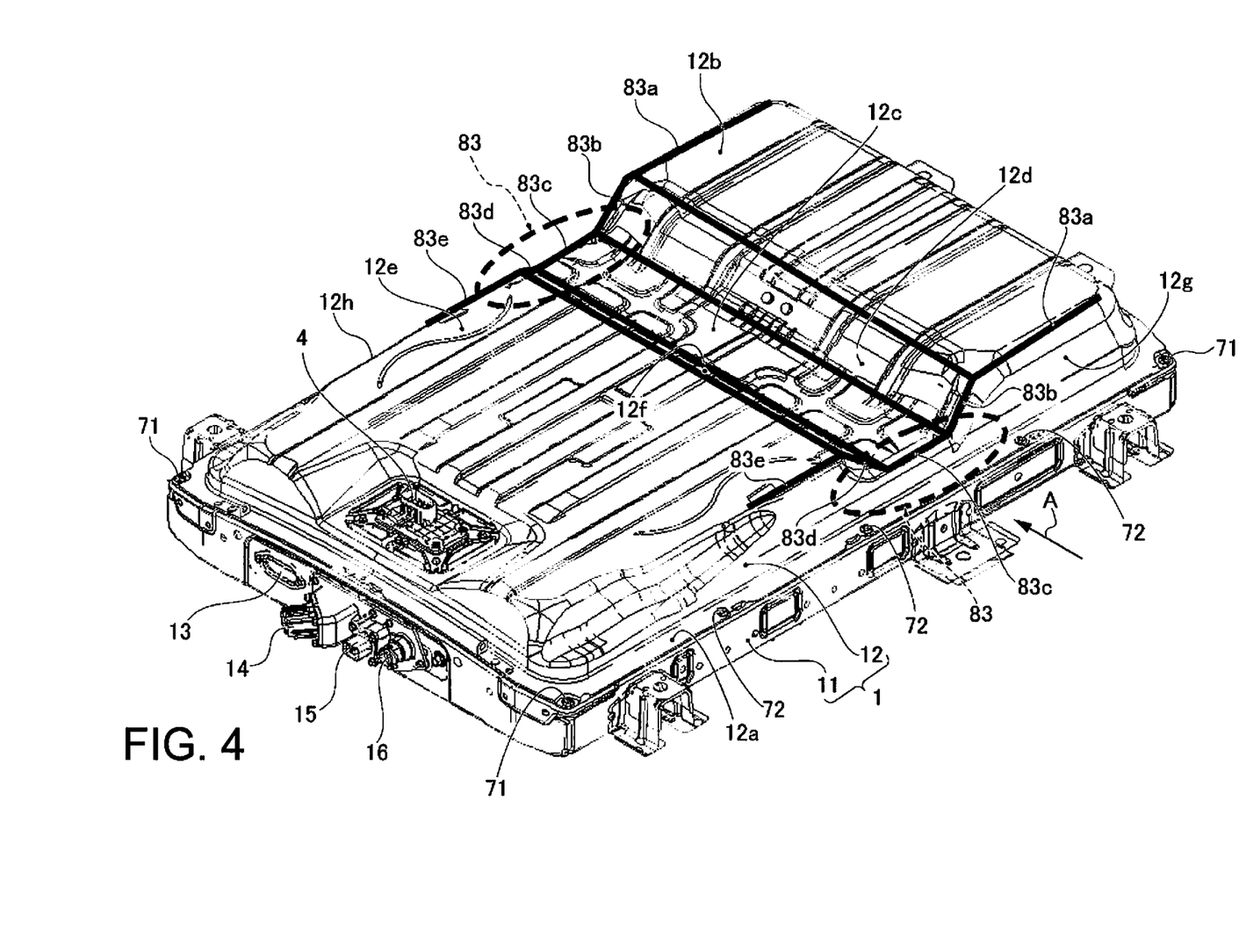
FIG. 4 is an overall perspective view showing a battery pack BP provided with the pressure release structure of the first embodiment.

As shown in FIG. 4, in the battery pack BP, the battery pack case 1 includes the battery pack lower frame 11 and the battery pack upper cover 12, and the battery module 2 is arranged in the battery pack lower frame 11 (FIG. 3). The battery pack lower frame 11 and the battery pack upper cover 12 are both formed of a metallic material such as iron.

Figure 5:
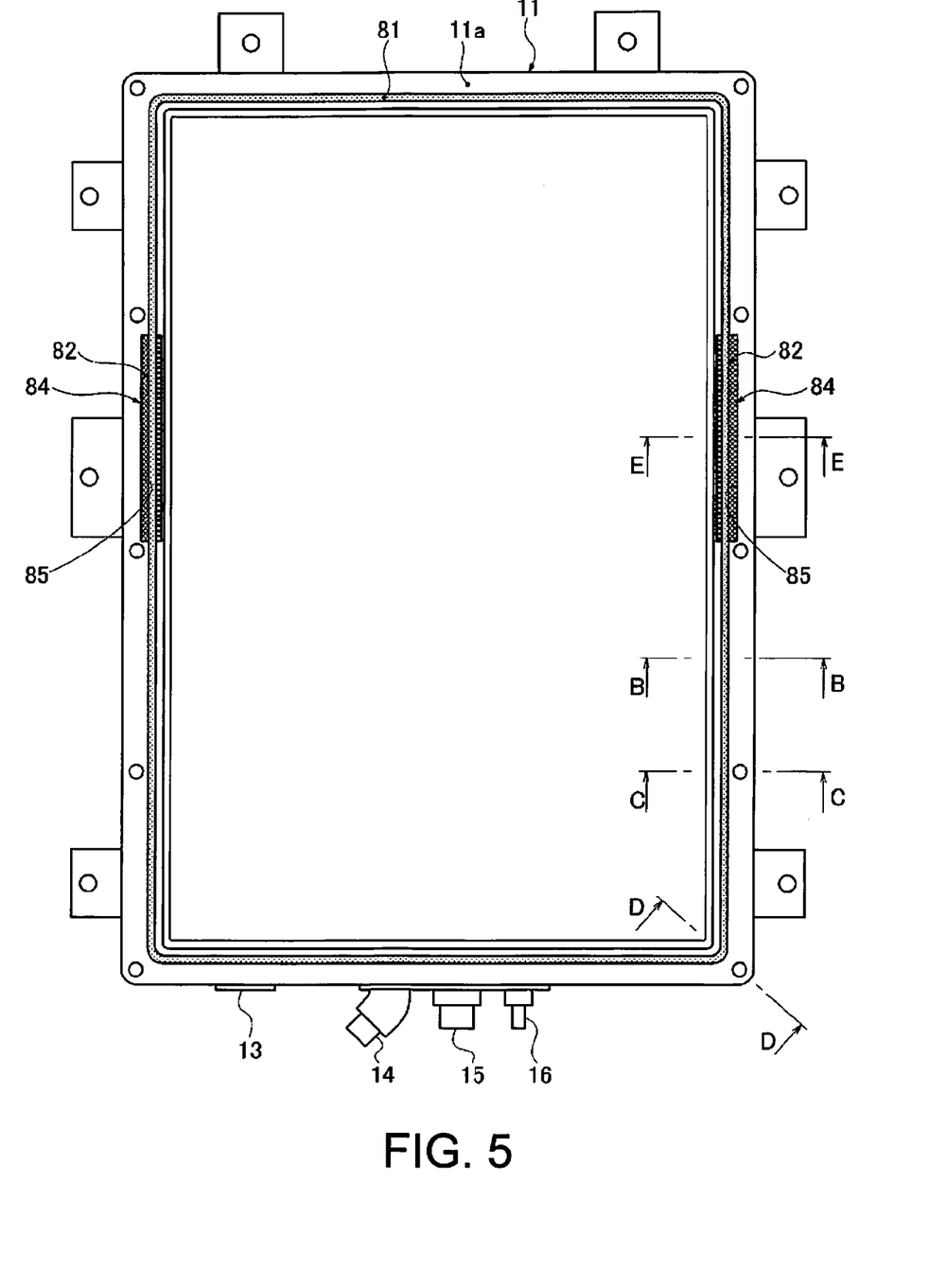
FIG. 5 is a plan view showing the battery back lower frame of the battery pack BP provided with the pressure release structure of the first embodiment.

The battery pack upper cover 12 is securely joined to the battery pack lower frame 11 via the weak adhesive seal member 82 and the strong adhesive seal member 81 which extends continuously about the entire perimeter along the respective outside peripheral edge portions 11a, 12a (FIG. 5).

As shown in FIG. 4, the battery pack upper cover 12 is provided with the deforming stepped portions 83, which have a height difference in the heightwise direction. As shown in FIG. 5, the weakly joined portions 84, in which the joint strength is lower than other joined portions, are set in areas within the weak adhesive seal member 82 and the strong adhesive seal member 81 which extends continuously about the entire perimeter, the areas corresponding to the deforming stepped portions 83.

The detailed constitution of the deforming stepped portions 83 will be described on the basis of FIG. 4. In upper surface sections of the battery pack upper cover 12 are formed a first planar portion 12b, a second planar portion 12c that is lower than the first planar portion 12b, and a first sloping surface 12d connecting the first planar portion 12b and the second planar portion 12c. There are additionally formed a third planar portion 12e which is lower than the first planar portion 12b but higher than the second planar portion 12c, and a second sloping surface 12f connecting the third planar portion 12e and the second planar portion 12c. On left and right side surface sections of the battery pack upper cover 12 are formed a left sloping side surface 12g and a right sloping side surface 12h which extend diagonally downward from vehicle-widthwise-end portions of the first planar portion 12b, the second planar portion 12c, the first sloping surface 12d, the third planar portion 12e, and the second sloping surface 12f.

The basic constitution of the deforming stepped portions 83 is formed by a first ridgeline 83a at which left and right sloping side surfaces 12g, 12h and the first planar portion 12b intersect, a second ridgeline 83b at which left and right sloping side surfaces 12g, 12h and the first sloping surface 12d intersect, and a third ridgeline 83c at which left and right sloping side surfaces 12g, 12h and the second planar portion 12c intersect. Also formed are a fourth ridgeline 83d at which left and right sloping side surfaces 12g, 12h and the second sloping surface 12f intersect, and a fifth ridgeline 83e at which left and right sloping side surfaces 12g, 12h and the third planar portion 12e intersect.

Figure 12:
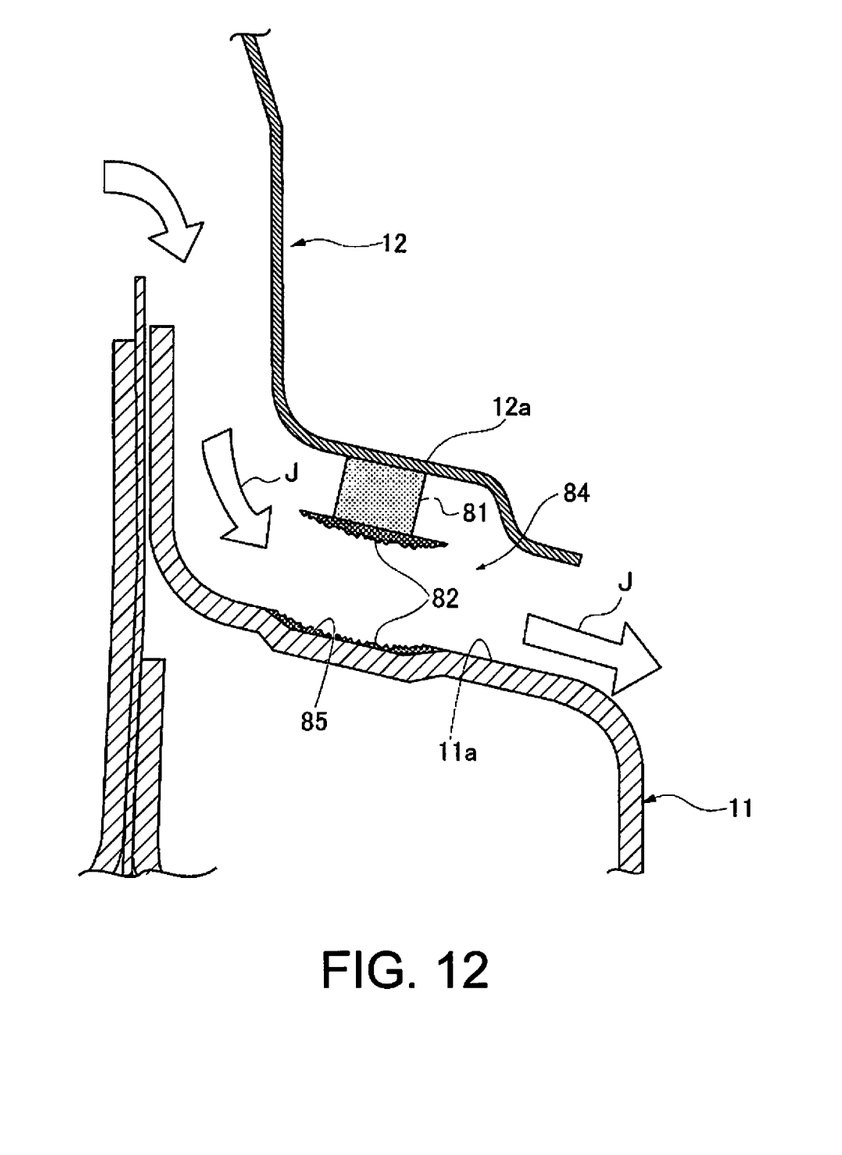
FIG. 12 is an end view taken along line F-F of FIG. 11, showing a separation opening of the upper cover in a state of pressure release in the battery pack BP provided with the pressure release structure of the first embodiment.

The strong adhesive seal member 81 and the weak adhesive seal member 82 are adhesive seal members made of a urethane-based adhesive. As the strong adhesive seal member 81, there is employed an adhesive seal member having adhesive strength that meets certain environmental conditions and input load conditions. Herein, the environmental conditions are sealing ability-assurance conditions for water-tightness inhibiting water infiltration into the case chamber interior during high-pressure car washing or travel on flooded roads, and for air-tightness maintaining the case chamber interior in a hermetic state in the face of environmental temperature changes. The input load conditions are input endurance conditions such that the occurrence of cracking or rupture in response to input of impact during a frontal collision or side collision, or to input of vibration from the road face or the like, is inhibited. As the weak adhesive seal member 82, there is employed an adhesive seal member which, while having adhesive strength that meets the environmental conditions and input load conditions, relies on a paint seal having lower adhesive strength than the strong adhesive seal member 81. The weak adhesive seal member 82 has a property whereby, when strong force is applied in a direction separating the adherend subsequent to curing, the adhesive itself fragments (cohesion failure), rather than a property whereby the adhesive and the adherend separate (interfacial rupture) (see FIG. 12).

Figure 6:
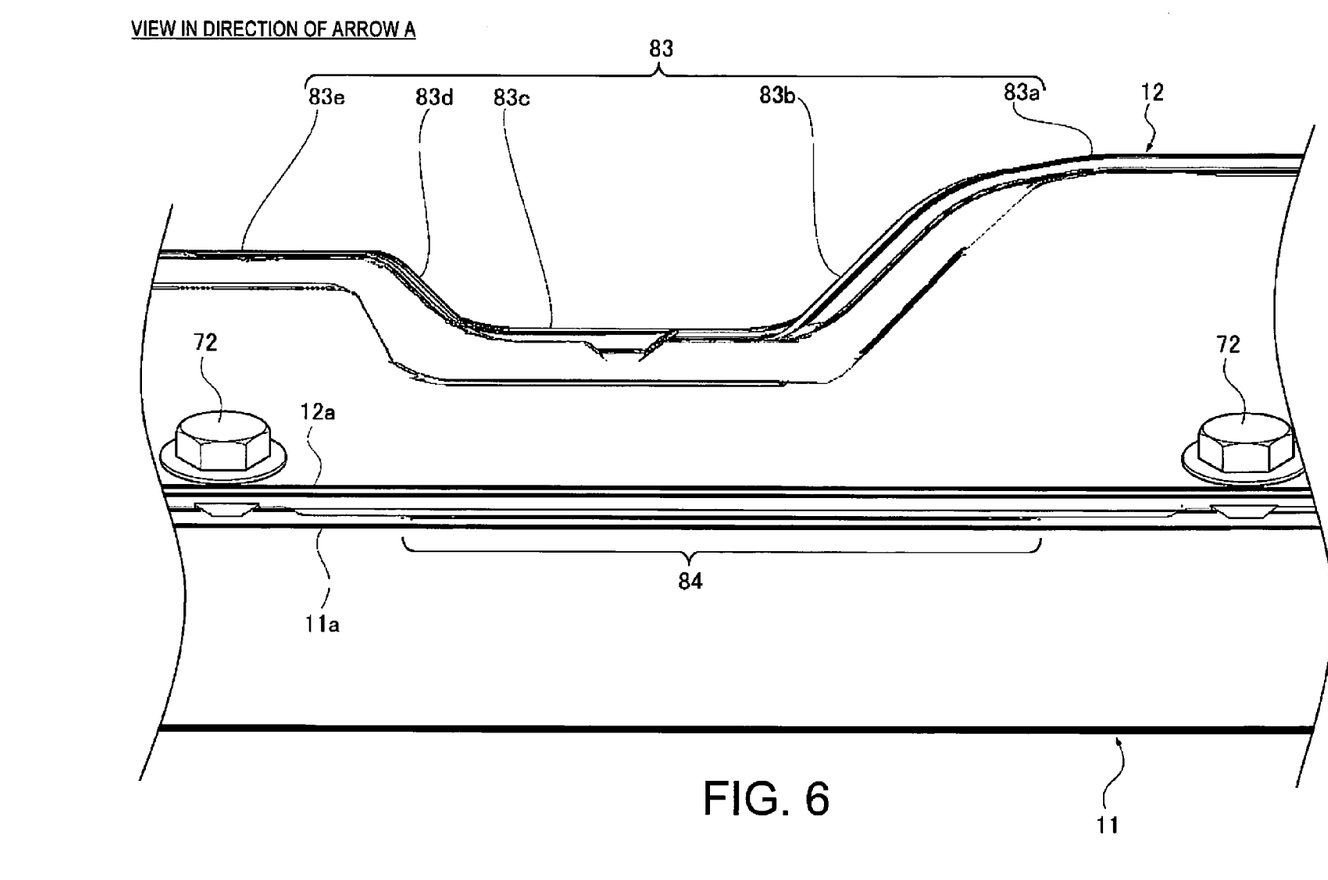
FIG. 6 is a sectional view taken in the direction of arrow A of FIG. 4, showing a deforming stepped portion and a weakly joined portion constituting the pressure release structure of the battery pack BP of the first embodiment.

As shown in FIG. 5, the weak adhesive seal member 82 fills the recessed areas 85 which have been provided to left-right symmetrical areas in the vehicle width direction, corresponding to the deforming stepped portions 83, in the outside peripheral edge portion 11a of the battery pack lower frame 11. Specifically, as shown in FIG. 6, the weak adhesive seal member 82 is interposed for the purpose of setting the weakly joined portions 84 having lower joint strength than other joined portions, in areas corresponding to the deforming stepped portions 83 (the ridgelines 83a, 83b, 83c, 83d, 83e), which areas are sandwiched between two of the shoulder bolts 72, 72.

As shown in FIG. 5, the strong adhesive seal member 81 is interposed in continuous fashion about the entire perimeter along the outside peripheral edge portion 11a, including the recessed areas 85, of the battery pack lower frame 11. The joining structures of the battery pack lower frame 11 and the battery pack upper cover 12 will be described in more specific terms here.

Figure 7:
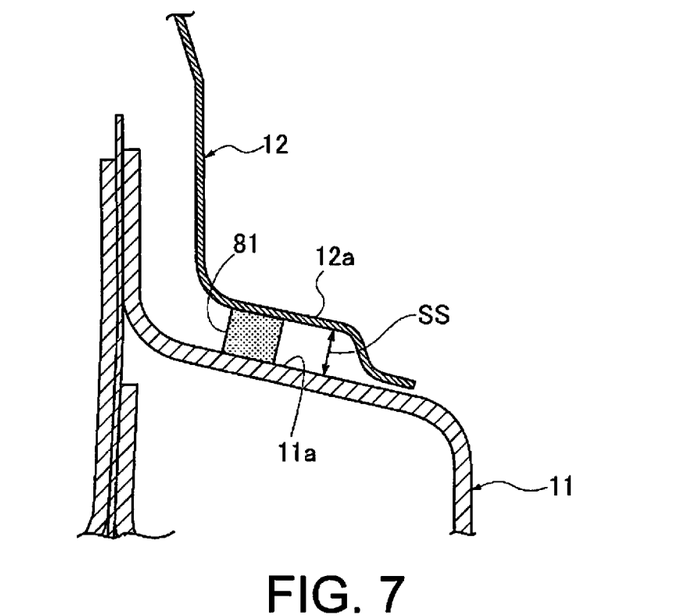
FIG. 7 is an end view taken along line B-B of FIG. 5, showing a joining structure in a normal joined portion of the lower frame and the upper cover in the battery pack BP provided with the pressure release structure of the first embodiment.
Figure 8:
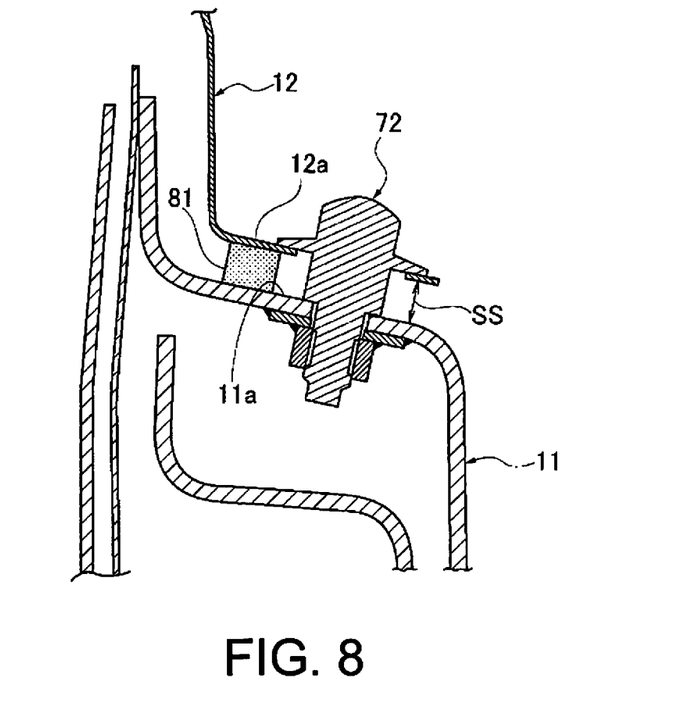
FIG. 8 is an end view taken along line C-C of FIG. 5, showing a joining structure in a shoulder bolt-secured portion of the lower frame and the upper cover in the battery pack BP provided with the pressure release structure of the first embodiment.
Figure 9:
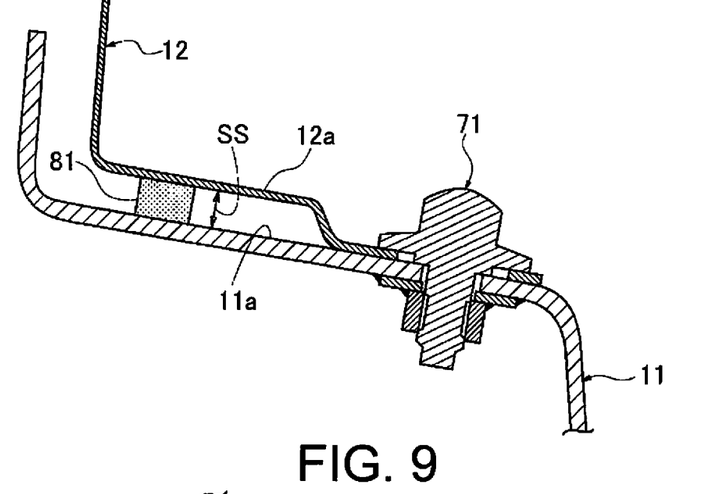
FIG. 9 is an end view taken along line D-D of FIG. 5, showing a joining structure in a grounding bolt-secured portion of the lower frame and the upper cover in the battery pack BP provided with the pressure release structure of the first embodiment.

As shown in FIG. 7, the joining structure in a normal joined portion is one in which only the strong adhesive seal member 81 is interposed within a sealing space SS between the respective outside peripheral edge portions 11a, 12a. As shown in FIG. 8, the joining structure in a shoulder bolt-secured portion is one in which only the strong adhesive seal member 81 is interposed within the sealing space SS, at a position slightly towards the inside in relation to the shoulder bolt 72, in the respective outside peripheral edge portions 11a, 12a. As shown in FIG. 9, the joining structure in a grounding bolt-secured portion is one in which only the strong adhesive seal member 81 is interposed within the sealing space SS, at an inside position away from the grounding bolt 71, in the respective outside peripheral edge portions 11a, 12a. At the position secured by the grounding bolt 71, the outside peripheral edge portions 11a, 12a are brought into contact, thereby imparting a spacer function that ensures the sealing space SS.

Figure 10:
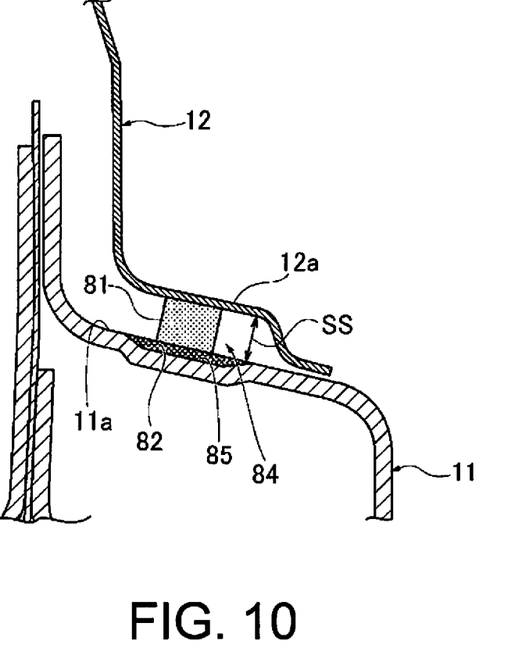
FIG. 10 is an end view taken along line E-E of FIG. 5, showing a joining structure in a weakly joined portion of the lower frame and the upper cover in the battery pack BP provided with the pressure release structure of the first embodiment.

In contrast to this, in the joining structure of the weakly joined portions 84, as shown in FIG. 10, the strong adhesive seal member 81 and the weak adhesive seal member 82 are interposed within the sealing space SS between the respective outside peripheral edge portions 11a, 12a. That is, the upper surface of the weak adhesive seal member 82 filling the recessed areas 85 is positioned coplanar to the normal surface (the outside edge surface excluding the recessed areas 85) of the outside peripheral edge portion 11a of the battery pack lower frame 11, and the strong adhesive seal member 81 of cross sectional shape similar to that in the normal joined portions and the bolt-secured portions is interposed overlapping the upper surface of the weak adhesive seal member 82.

Next, the operation will be described. The description of operation in the pressure-relieving structure of the vehicle installed battery pack of the first embodiment will be divided into the "Battery case joining and securing operation," "Battery case sealing operation," and "Battery case pressure release operation at times of high internal pressure."

Battery Case Joining and Securing Operation

During joining and securing of the battery pack upper cover 12 to the battery pack lower frame 11, the operation passes through:
(a) a weak adhesive seal filling step
(b) a strong adhesive seal filling step
(c) a spacer and clamp setting step
(d) a grounding bolt fastening step
(e) a shoulder bolt fastening step In the weak adhesive seal filling step, the recessed areas 85 of the outside peripheral edge portion 11a of the battery pack lower frame 11 are filled with the weak adhesive seal member 82, in amounts equal to the depression volume of the recessed areas 85. In the strong adhesive seal filling step, the strong adhesive seal member 81 is applied in continuous fashion along the outside peripheral edge portion 11a of the battery pack lower frame 11, while maintaining a tall built-up cross section. In the spacer and clamp setting step, a plurality of spaces for maintaining the seal spacing to the inside of the applied strong adhesive seal member 81 are set, and clamps are respectively set at the positions where the spacers were set. In the grounding bolt fastening step, the grounding bolts 71 for maintaining the seal spacing are fastened and secured at the four corners. Through the aforedescribed spacer and clamp setting step and grounding bolt fastening step, constant seal spacing is maintained about the entire case perimeter. In the shoulder bolt fastening step, after waiting for the strong adhesive seal member 81 and the weak adhesive seal member 82 to cure to some extent while maintaining constant seal spacing about the entire case perimeter, the clamps are removed, and the six shoulder bolts 72 are fastened and secured.

Consequently, the strong adhesive seal member 81 is handed in such a way as to have a fixed width and thickness about the entire perimeter, and the weak adhesive seal member 82 is managed in such a way that the upper surface thereof is coplanar to the normal surface of the outside peripheral edge portion 11a of the battery pack lower frame 11.

Battery Case Sealing Operation

The battery pack BP, which is installed below the vehicle body floor, is subjected to harsh environmental conditions and input load conditions, and it is necessary to ensure seal strength sufficient to overcome these conditions. A battery case sealing action reflecting this is described below.

In the first embodiment, there was adopted for the seal members a constitution employing the strong adhesive seal member 81 and the weak adhesive seal member 82 made from a urethane-based adhesive having adhesive strength meeting certain environmental conditions and input load conditions (FIGS. 7-10). Consequently, at normal times in the absence of internal pressure, the adhesive seal members 81, 82, by virtue of having adhesive strength just sufficient to meet selected environmental conditions, inhibit water infiltration into the case chamber interior during high-pressure car washing or travel on flooded roads, and ensure water-tightness of the case chamber interior. Additionally, air-tightness such that the case chamber interior is maintained in a hermetic state despite fluctuations in case internal pressure within a predetermined range due to changes in outside air temperature or case internal temperature is ensured. Moreover, the adhesive seal members 81, 82, by virtue of having adhesive strength just sufficient to meet selected input load conditions, inhibit the occurrence of seal cracking or seal rupture in response to input of impact during a frontal collision or side collision, or to input of vibration from the road face or the like, and ensure seal endurance. Specifically, seal performance required of the battery pack BP which is to be installed below the vehicle body floor is ensured.

Ordinarily, a gasket is employed as the part interposed between two case members in order to provide reliable sealing performance. However, in the case of large case parts, such as with a battery pack, gaskets, which are manufactured from elastic materials, are prone to deformation during assembly, thus requiring laborious effort to arrange the gasket at the pre-specified position, and diminishing the ease of the joining procedure. Additionally, it is necessary to prepare large gaskets from which defectives have been eliminated through quality control in order to be able to provide a reliable seal about the entire perimeter, and this leads to increased cost. By contrast, in the case of the adhesive seal members 81, 82, the sealing members can be set through the weak adhesive seal member 82 filling procedure and the strong adhesive seal member 81 application procedure as described above, and therefore the efficiency of the joining procedure is higher than with gaskets. Additionally, it is sufficient just to prepare a urethane-based adhesive in a container for the procedure, and because a liquid adhesive can be used without waste, the cost is lower than with gaskets.

In the first embodiment, the adhesive seal members are formed by the strong adhesive seal member 81, and the weak adhesive seal member 82 having a lower adhesive strength than the strong adhesive seal member 81. A constitution in which the recessed areas 85 provided in the areas corresponding to the deforming stepped portions 83 in the outside peripheral edge portion 11a of the battery pack lower frame 11 are filled by the weak adhesive seal member 82, and the strong adhesive seal member 81 is interposed in continuous fashion about the entire perimeter along the outside peripheral edge portion 11a, including the recessed areas 85, is adopted (FIG. 5). Specifically, by interposing the strong adhesive seal member 81 in continuous fashion about the entire perimeter of the outside peripheral edge portion 11a of the battery pack lower frame 11, variability in the water-tightness and input endurance performance are minimized about the entire perimeter where the seal is interposed, and the aforedescribed required sealing performance is ensured. As shown in FIG. 10, a constitution is adopted for the joints in the recessed areas 85 in which the strong adhesive seal member 81 overlaps the weak adhesive seal member 82 situated to the lower side, and the weakly joined portion 84 is set by this section. Consequently, by employing, as the adhesive seal members, the strong adhesive seal member 81 for the entire perimeter and the weak adhesive seal member 82 which is partially overlapped by the strong adhesive seal member 81, it is possible to both ensure the required sealing performance, and set the weakly joined portions 84.

In the first embodiment, there is adopted a configuration in which the upper surface of the weak adhesive seal member 82 filling the recessed areas 85 is positioned in the same plane as the normal surface of the outside peripheral edge portion 11a of the battery pack lower frame 11 (FIG.

10). Consequently, the strong adhesive seal member 81, which has a consistent cross sectional shape, can be interposed in continuous fashion about the entire perimeter of the outside peripheral edge portion 11a of the battery pack lower frame 11, to create uniform water-tight performance and input endurance performance about the entire perimeter where the seal is interposed, and ensure the required sealing performance.

Battery Case Pressure Release Operation at Times of High Internal Pressure

In the aforedescribed manner, while sealing performance is required under normal circumstances, when the internal pressure has risen due to the production of gases within the case, a fuse function whereby the sealing function is interrupted, and the internal gases are discharged to outside the case, is required. A battery case pressure release operation at times of high internal pressure reflecting this is described below on the basis of FIGS. 11 and 12.

In the first embodiment, the battery pack upper cover 12 is provided with the deforming stepped portions 83 having a height difference in the heightwise direction. Within the adhesive seal members 81, 82 extending continuously about the entire perimeter, the weakly joined portions 84 of lower joint strength than other joined portions are set in areas corresponding to the deforming stepped portions 83 (FIG. 6).

Figure 11:
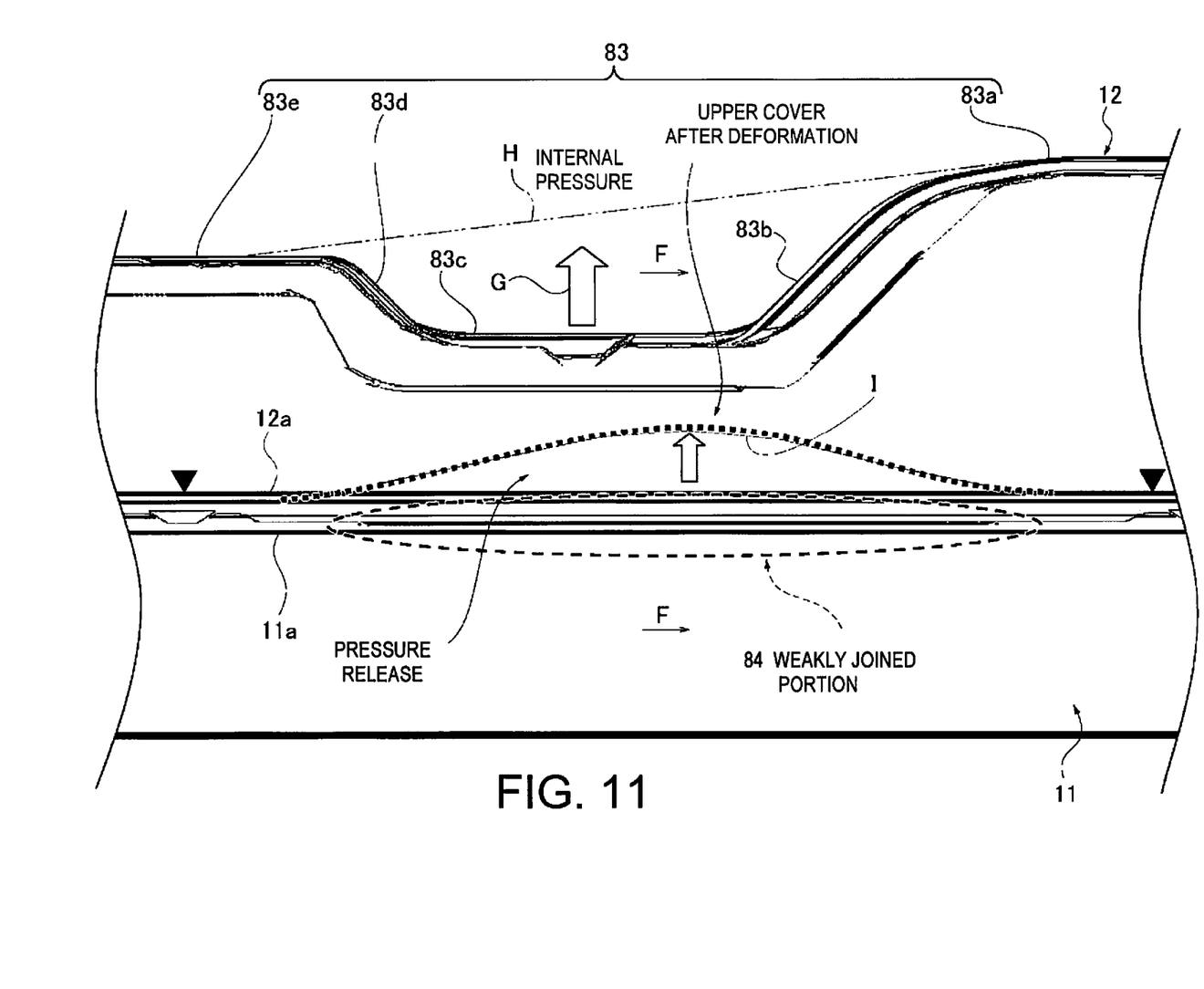
FIG. 11 is an action description diagram showing a pressure release action in the battery pack BP provided with the pressure release structure of the first embodiment.

Consequently, when gases are produced by the battery module 2 arranged in the interior of the case chamber, and the internal pressure of the case chamber rises, the internal pressure concentrates at sections of the case structure which protrude furthest to the case center within the case structure, that is, the deforming stepped portions 83 of the battery pack upper cover 12, as shown by arrow G in FIG. 11. The reason why the internal pressure concentrates at the deforming stepped portions 83 shall now be described in detail. It is assumed that, when the pressure of gases confined in the case interior rises, the pressure (internal pressure) bearing on the case inside surfaces is constant for all of the case inside surfaces. That is, in an extreme scenario, pressure acts in such a way as to transform the case into a sphere (all inside surfaces are the same distance from the center when transformed into a sphere). However, as the rigidity of the case is not so low as to permit transformation into a sphere by such internal pressures, the deformation does not exceed a small level at which the basic shape is maintained. Therefore, sections that do not approximate a sphere (sections that differ greatly from hypothetical case internal surfaces situated the same distance from a hypothetical center when the case is transformed into a sphere) are subjected to high pressure, while sections that approximate a sphere (sections that do not differ from hypothetical case internal surfaces) are subjected to lower pressures. Actually, since the case shape is complex, the pressure distribution is also complex, but in terms of the general concept, the distribution is no different from one whereby sections that do not approximate a sphere are pressed more strongly. This action of pressing strongly is termed internal stress concentration. Consequently, internal stress concentrates at the deforming stepped portions 83, which are sections that are recessed towards the center side (the inside) of the case (or stated the other way, that protrude towards the center side).

Due to this internal stress concentration, the battery pack upper cover 12 undergoes deformation in a direction of reducing the height difference in the step heightwise direction in the deforming stepped portions 83 (the direction of the hypothetical line shown by H in FIG. 11), that is, from the lower step towards the higher step in the heightwise direction. Due to this cover deformation, the joint of the weakly joined portion 84 which has been set in the area corresponding to the deforming stepped portion 83 splits, the outside peripheral edge portion 12a of the battery pack upper cover 12 (the upper cover after deformation in FIG. 11) separates from the outside peripheral edge portion 11a of the battery pack lower frame 11, and an opening I forms in the weakly joined portion 84. For this reason, when the internal pressure of the case chamber has risen due to production of gases, the internal gases are discharged to the outside from the opening I of the weakly joined portion 84 as shown by arrow J in FIG. 12, without inducing rupture or breakage of the battery pack upper cover 12.

Thus, internal pressure concentrated at the deforming stepped portion 83 of the battery pack upper cover 12 prompts deformation of the battery pack upper cover 12, and in association with deformation of the cover, the weakly joined portion 84 splits, forming the opening I through which the case chamber communicates with the outside air. For this reason, when the internal pressure of the case chamber has risen due to production of gases, the internal gases can be discharged to the outside through the separable opening of the weakly joined portion 84.

In the first embodiment, the first planar portion 12b, the second planar portion 12c, the first sloping surface 12d, the third planar portion 12e, and the second sloping surface 12f are formed in upper surface sections of the battery pack upper cover 12, and the left sloping side surface 12g and the right sloping side surface 12h are formed in left and right side surface sections. A constitution in which the deforming stepped portions 83 are formed by the first ridgeline 83a, the second ridgeline 83b, the third ridgeline 83c, the fourth ridgeline 83d, and the fifth ridgeline 83e at which the upper surface sections and the left and right side surface sections intersect is adopted (FIG. 4). Specifically, the deforming stepped portion 83 is a section in which the second ridgeline 83b, the third ridgeline 83c, and the fourth ridgeline 83d sink towards the vehicle downward direction with respect to a line that connects an end of the first ridgeline 83a and an end of the fifth ridgeline 83e as shown by H in FIG. 11, the deforming stepped portion 83 protruding furthest towards the case center in the case structure. Therefore, when the internal pressure in the case chamber has risen, the internal pressure concentrates at the second ridgeline 83b, the third ridgeline 83c, and the fourth ridgeline 83d which sink towards the vehicle downward direction. Due to this internal pressure concentration, the battery pack upper cover 12 undergoes considerable deformation in the direction of eliminating the degree to which the second ridgeline 83b, the third ridgeline 83c, and the fourth ridgeline 83d sink towards the vehicle downward direction. Consequently, by forming the deforming stepped portions 83 which undergo considerable cover deformation in response to an internal pressure rise in the case chamber, when the internal pressure of the case chamber increases due to production of gases, the pressure is released in a reliable manner from the weakly joined portions 84 due to the cover deformation.

The first planar portion 12b, the second planar portion 12c, and the first sloping surface 12d are formed in upper surface sections of the battery pack upper cover 12, and the left sloping side surface 12g and the right sloping side surface 12h are formed in left and right side surface sections. The deforming stepped portions 83 may be formed by the first ridgeline 83a, the second ridgeline 83b, and the third ridgeline 83c at which the upper surface sections and the left and right side surface sections intersect. In this case, deformation of the battery pack upper cover 12 due to internal stress concentration would be brought about in a direction extending the polygonal line angle of the first ridgeline 83a and the second ridgeline 83b, and the polygonal line angle of the second ridgeline 83b, and the third ridgeline 83c. Consequently, by forming the deforming stepped portions 83 which are subjected to sufficient cover deformation in response to an internal pressure rise in the case chamber, when the internal pressure of the case chamber increases due to production of gases, the pressure is released from the weakly joined portions 84 due to the cover deformation.

The advantageous effects are described next. The advantageous effects cited below can be obtained with the vehicle installed battery pack pressure release structure of the first embodiment.

(1) A vehicle installed battery pack in which a battery pack case 1 includes a battery pack lower frame 11 and a battery pack upper cover 12, a battery pack module 2 being arranged in the battery pack lower frame 11, wherein the battery pack upper cover 12 is securely joined to the battery pack lower frame 11 via a seal member (a strong adhesive seal member 81 and a weak adhesive seal member 82) extending continuously about the entire perimeter of respective outside peripheral edge portions 11a, 12a; the battery pack upper cover 12 is provided with a deforming stepped portion 83 having a height difference at least in the heightwise direction; and a weakly joined portion 84 of lower joint strength than other joined portions is set in an area of the seal member (a strong adhesive seal member 81 and a weak adhesive seal member 82) extending continuously about the entire perimeter, the area corresponding to the deforming stepped portion 83 (FIG. 6). Thus, the constitution is such that internal pressure concentrated in the deforming stepped portion 83 of the battery pack upper cover 12 prompts deformation of the battery pack upper cover 12, and in association with deformation of the cover, the weakly joined portion 84 splits, forming the opening I through which the case chamber communicates with the outside air. For this reason, when the internal pressure of the case chamber has risen due to production of gases, the internal gases can be discharged to the outside through the separable opening of the weakly joined portion 84.

(2) A first planar portion 12b, a second planar portion 12c lower than the first planar portion 12b, and a first sloping surface 12d connecting the first planar portion 12b and the second planar portion 12c, are formed in upper surface sections of the battery pack upper cover 12, a left sloping side surface 12g and a right sloping side surface 12h which extend diagonally downward from vehicle-widthwise-end portions of the first planar portion 12b, the second planar portion 12c, and the first sloping surface 12d are formed in left and right side surface sections of the battery pack upper cover 12, and the deforming stepped portion 83 is formed to have a first ridgeline 83a at which the left and right sloping side surfaces 12g, 12h and the first planar portion 12b intersect, a second ridgeline 83b at which the left and right sloping side surfaces 12g, 12h and the first sloping surface 12d intersect, and a third ridgeline 83c at which the left and right sloping side surfaces 12g, 12h and the second planar portion 12c intersect (FIG. 4). Therefore, in addition to the advantageous effect of (1), by forming the deforming stepped portion 83 which is subjected to sufficient cover deformation in response to an internal pressure rise in the case chamber, when the internal pressure of the case chamber increases due to production of gases, the pressure can be released from the weakly joined portion 84 due to the cover deformation.

(3) A third planar portion 12e which is lower than the first planar portion 12b but higher than the second planar portion 12c, and a second sloping surface 12f connecting the third planar portion 12e and the second planar portion 12c, are added to upper surface sections of the battery pack upper cover 12, and the deforming stepped portion 83 is formed while adding to the first ridgeline 83a, the second ridgeline 83b, and the third ridgeline 83c, a fourth ridgeline 83d at which left and right sloping side surfaces 12g, 12h and the second sloping surface 12f intersect, and a fifth ridgeline 83e at which left and right sloping side surfaces 12g, 12h and the third planar portion 12e intersect (FIG. 4). Therefore, in addition to the advantageous effect of (2), by increasing the cover deformability by the deforming stepped portion 83, when the internal pressure of the case chamber has risen due to production of gases, the pressure can be released from the weakly joined portion 84 through cover deformation, with good response and in a reliable manner.

(4) Adhesive seal member (a strong adhesive seal member 81 and a weak adhesive seal member 82) made of a urethane-based adhesive having adhesive strength meeting environmental conditions and input load conditions are employed as the seal members (FIGS. 7-10). Therefore, in addition to the advantageous effects of (1)-(3), the seal performance required of the battery pack BP can be ensured, and additionally, as compared with the case of employing a gasket as the seal member, the ease of the joining procedure is better, and cost reductions can be achieved.

(5) The adhesive seal member includes a strong adhesive seal member 81, and a weak adhesive seal member 82 having lower adhesive strength than the strong adhesive seal member 81, a recessed area 85 provided in an area corresponding to the deforming stepped portion 83 within an outside peripheral edge portion 11a of the battery pack lower frame 11 is filled by the weak adhesive seal member 82, and the strong adhesive seal member 81 is interposed in continuous fashion about the entire perimeter along the outside peripheral edge portion 11a, including the recessed area 85, of the battery pack lower frame 11 (FIG. 5). In this way, by employing the strong adhesive seal member 81 about the entire perimeter, and the weak adhesive seal member 82 which partially overlaps the strong adhesive seal member 81, as the adhesive seal members, in addition to the advantageous effect of (4), the required sealing performance can be ensured, while concomitantly setting the weakly joined portions 84.

(6) An upper surface of the weak adhesive seal member 82 filling the recessed area 85 is positioned coplanar to a normal surface of the outside peripheral edge portion 11a of the battery pack lower frame 11 (FIG. 10). Therefore, in addition to the advantageous effect of (5), sealing performance can be made uniform about the entire perimeter where the seal is interposed, and the required sealing performance can be ensured.

While the pressure release structure for a vehicle installed battery pack of the present invention has been described hereinabove on the basis of the first embodiment, the specific constitution is not limited to that of the first embodiment, and various modifications of and additions to the design are permissible within the scope of the invention as set forth in the claims.

In the first embodiment, there was shown an example in which the deforming stepped portions 83 are formed by the first ridgeline 83a, the second ridgeline 83b, the third ridgeline 83c, the fourth ridgeline 83d, and the fifth ridgeline 83e, at which ridgelines left and right side surface sections and upper surface sections of the battery pack upper cover 12 intersect. However, an example in which the deforming stepped portions are formed, e.g., by a first ridgeline, a second ridgeline, and a third ridgeline, at which ridgelines left and right side surface sections and upper surface sections of the battery pack upper cover intersect, would be acceptable as well. Specifically, provided that the deforming stepped portion is a structure constituted by a section having a height difference at least in the heightwise direction, and is adapted to prompt deformation of the battery pack upper cover when the internal pressure of the case chamber rises and the internal pressure becomes concentrated, the specific shape thereof is not limited to that of the first embodiment.

In the first embodiment, there was shown an example in which the strong adhesive seal member 81 and the weak adhesive seal member 82 made of a urethane-based adhesive are employed as the seal members. However, it would be acceptable to use a gasket seal member, or a combination of a gasket seal member and adhesive seal member, as the seal members, and the specific material for the seal members is not limited to the urethane-based adhesive of the first embodiment.

In the first embodiment, there was shown an example in which the weakly joined portions 84 are set within the strong adhesive seal member 81 which extends continuously about the entire perimeter, by superimposing the weak adhesive seal member 82 thereon in partial areas corresponding to the deforming stepped portions 83. However, depending on the material, combination, and the like of the seal members, the specific manner in which the weakly joined portions are set is not limited to that of the first embodiment, provided that sections of lower adhesive strength than other sections are set as the weakly joined portions.

In the first embodiment, there was shown an example in which the pressure release structure of the present invention is applied to an electric car of minivan type having a motor for propulsion as the sole power source for propulsion. However, the pressure release structure for a vehicle installed battery pack of the present invention may naturally be applied to electric cars of various types besides minivan type, such as sedan type, wagon type, SUV type, or the like. The structure can also be applied to hybrid vehicles having a motor for propulsion and an engine on board as power sources for propulsion. That is, the structure can be applied to any electric vehicle having a vehicle installed battery pack.

The invention claimed is:

1. A vehicle installed battery pack, a pressure release structure of the vehicle installed battery pack comprising:
   a battery pack case including a battery pack lower frame and a battery pack upper cover; and
   a plurality of battery pack modules disposed in the battery pack lower frame,
   the battery pack lower frame including a region for mounting the plurality of battery pack modules and an outside edge portion,
   the battery pack upper cover including a region for mounting the plurality of battery pack modules and an outside edge portion, the upper cover region having a plurality of different heights to accommodate different heights of upper surfaces of the plurality of battery pack modules,
   the battery pack upper cover being securely joined to the battery pack lower frame via a seal member extending continuously about an entire perimeter of respective outside peripheral edge portions of the battery pack upper cover and lower frame;
   the battery pack upper cover including
      a deforming stepped portion having a height difference at least in a heightwise direction, the deforming stepped portion being provided to the region for mounting the plurality of battery pack modules of the battery pack upper cover, the height difference of the deforming stepped portion corresponding to a difference in heights between adjacent battery pack modules disposed between the battery pack upper cover and the battery pack lower frame; and
      a weakly joined portion having a lower joint strength than other joined portions being set in an area of the seal member extending continuously about the entire perimeter, the area corresponding to the deforming stepped portion,
      the deforming stepped portion being configured to deform in a direction reducing the height difference when an internal pressure of the battery pack is at least a predetermined pressure without rupturing the battery pack upper cover.

2. The vehicle installed battery pack according to claim 1, wherein
   the battery pack upper cover has upper surface sections that include a first planar portion, a second planar portion, and a first sloping surface, the second planar portion being lower than the first planar portion, and the first sloping surface connecting the first planar portion and the second planar portion;
   the battery pack upper cover has left and right side surface sections that include a left sloping side surface and a right sloping side surface which extend diagonally downward from vehicle-widthwise-end portions of the first planar portion, the second planar portion, and the first sloping surface; and
   the deforming stepped portion is formed to have a first ridgeline at which the left and right sloping side surfaces and the first planar portion intersect, a second ridgeline at which the left and right sloping side surfaces and the first sloping surface intersect, and a third ridgeline at which the left and right sloping side surfaces and the second planar portion intersect.

3. The vehicle installed battery pack according to claim 2, wherein
   the upper surface sections of the battery pack upper cover further include a third planar portion which is lower than the first planar portion but higher than the second planar portion, and a second sloping surface connecting the third planar portion and the second planar portion; and
   the deforming stepped portion is formed while adding to the first ridgeline, the second ridgeline, and the third ridgeline a fourth ridgeline at which the left and right sloping side surfaces and the second sloping surface intersect, and a fifth ridgeline at which the left and right sloping side surfaces and the third planar portion intersect.

4. The vehicle installed battery pack according to claim 3, wherein
   the seal member includes a pair of adhesive seal members made of a urethane-based adhesive having adhesive strength meeting environmental conditions and input load conditions.

5. The vehicle installed battery pack according to claim 4, wherein
   the adhesive seal members include a strong adhesive seal member, and a weak adhesive seal member having a lower adhesive strength than the strong adhesive seal member;
   the battery pack lower frame has a recessed area provided in an area of an outside peripheral edge portion of the battery pack lower frame, the recessed area corresponding to the deforming stepped portion, the recessed area is filled by the weak adhesive seal member; and
   the strong adhesive seal member is interposed in continuous fashion about the entire perimeter along the outside peripheral edge portion, including the recessed area, of the battery pack lower frame.

6. The vehicle installed battery pack according to claim 5, wherein
   an upper surface of the weak adhesive seal member filling the recessed area is positioned coplanar to a normal surface of the outside peripheral edge portion of the battery pack lower frame.

7. The vehicle installed battery pack according to claim 2, wherein
   the seal member includes a pair of adhesive seal members made of a urethane-based adhesive having adhesive strength meeting environmental conditions and input load conditions.

8. The vehicle installed battery pack according to claim 7, wherein
   the adhesive seal members include a strong adhesive seal member, and a weak adhesive seal member having a lower adhesive strength than the strong adhesive seal member;
   the battery pack lower frame has a recessed area provided in an area of an outside peripheral edge portion of the battery pack lower frame, the recessed area corresponding to the deforming stepped portion, the recessed area is filled by the weak adhesive seal member; and
   the strong adhesive seal member is interposed in continuous fashion about the entire perimeter along the outside peripheral edge portion, including the recessed area, of the battery pack lower frame.

9. The vehicle installed battery pack according to claim 8, wherein
   an upper surface of the weak adhesive seal member filling the recessed area is positioned coplanar to a normal surface of the outside peripheral edge portion of the battery pack lower frame.

10. The vehicle installed battery pack according to claim 1, wherein
    the seal member includes a pair of adhesive seal members made of a urethane-based adhesive having adhesive strength meeting environmental conditions and input load conditions.

11. The vehicle installed battery pack according to claim 10, wherein
    the adhesive seal members include a strong adhesive seal member, and a weak adhesive seal member having a lower adhesive strength than the strong adhesive seal member;
    the battery pack lower frame has a recessed area provided in an area of an outside peripheral edge portion of the battery pack lower frame, the recessed area corresponding to the deforming stepped portion, the recessed area is filled by the weak adhesive seal member; and
    the strong adhesive seal member is interposed in continuous fashion about the entire perimeter along the outside peripheral edge portion, including the recessed area, of the battery pack lower frame.

12. The vehicle installed battery pack according to claim 11, wherein
    an upper surface of the weak adhesive seal member filling the recessed area is positioned coplanar to a normal surface of the outside peripheral edge portion of the battery pack lower frame.

13. The vehicle installed battery pack according to claim 1, wherein
    a deformation of the deforming stepped portion causes the weakly joined portion to separate.

* * * * *